(12) United States Patent
Blaszczyk

(10) Patent No.: US 8,408,524 B2
(45) Date of Patent: Apr. 2, 2013

(54) APPARATUS FOR HUMIDIFYING A GAS FLOW

(75) Inventor: Janusz Blaszczyk, Richmond (CA)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/556,299

(22) Filed: Jul. 24, 2012

(65) Prior Publication Data

US 2012/0288773 A1    Nov. 15, 2012

Related U.S. Application Data

(62) Division of application No. 12/438,096, filed as application No. PCT/EP2006/008904 on Sep. 13, 2006.

(51) Int. Cl.
*B01F 3/04* (2006.01)
(52) U.S. Cl. ..... 261/2; 261/79.2; 55/385.3; 55/DIG. 14; 96/239; 429/413
(58) Field of Classification Search ............. 261/2, 79.2; 55/385.3, 394, 466, DIG. 14; 95/261, 269, 95/272; 96/204, 216, 237, 239, 360; 429/413, 429/414
See application file for complete search history.

(56) References Cited

U.S. PATENT DOCUMENTS

| | | | |
|---|---|---|---|
| 2,178,389 A | 10/1939 | Bentley | |
| 2,812,827 A | 11/1957 | Worley et al. | |
| 2,858,903 A | 11/1958 | Goetz et al. | |
| 3,766,717 A | 10/1973 | Belt | |
| 3,788,043 A | 1/1974 | Dorr et al. | |
| 3,892,550 A * | 7/1975 | Riis | 55/434.2 |
| 4,023,938 A | 5/1977 | Guth et al. | |
| 4,409,005 A * | 10/1983 | McKendrick | 95/26 |
| 4,457,305 A * | 7/1984 | Shanks et al. | 128/205.12 |
| 4,556,541 A * | 12/1985 | Gartside et al. | 422/145 |
| RE32,989 E * | 7/1989 | Mann | 55/323 |
| 5,114,443 A * | 5/1992 | Overby | 96/409 |
| 6,579,637 B1 | 6/2003 | Savage et al. | |
| 7,476,458 B2 * | 1/2009 | Fujita | 429/437 |
| 7,615,296 B2 * | 11/2009 | Ohara et al. | 429/410 |
| 8,187,756 B2 * | 5/2012 | Fujita et al. | 429/410 |
| 2002/0086194 A1 | 7/2002 | Blaszcyk et al. | |
| 2002/0094467 A1 * | 7/2002 | Nonobe et al. | 429/34 |
| 2005/0053806 A1 * | 3/2005 | Mukai et al. | 429/12 |
| 2006/0240299 A1 * | 10/2006 | Kanasugi | 429/24 |

FOREIGN PATENT DOCUMENTS

| | | |
|---|---|---|
| DE | 199 11252 C1 | 11/2000 |
| DE | 199 53 803 A1 | 5/2001 |
| DE | 101 29 098 A1 | 1/2003 |
| JP | 2002-33111 A | 1/2002 |
| JP | 2004-60729 A | 2/2004 |
| JP | 2005-71926 A | 3/2005 |
| JP | 2006-142252 A | 6/2006 |
| WO | WO 94/08502 A1 | 4/1994 |

OTHER PUBLICATIONS

International Search Report dated May 24, 2007 (twelve (12) pages).

* cited by examiner

*Primary Examiner* — Charles Bushey
(74) *Attorney, Agent, or Firm* — Crowell & Moring LLP

(57) ABSTRACT

In a device for humidifying a gas flow, an atomized liquid is combined with a gas flow in a spray chamber, and passed through a generally U-shaped gas flow passage having a first generally vertical part 3 through which the atomized liquid and gas passes to a lower part 4. From there, the gas passes generally vertically upwardly to an outlet 9. The lower part of the passage incorporates an opening 6 to a water separator 7. The opening 6 is closable by a float device 10, or includes a flow restricting control valve 13.

5 Claims, 1 Drawing Sheet

APPARATUS FOR HUMIDIFYING A GAS FLOW

CROSS REFERENCE TO RELATED APPLICATIONS

This application is a divisional application of U.S. patent application Ser. No. 12/438,096, filed Feb. 19, 2009, which is a National Stage of PT/EP2006/008904, filed Sep. 13, 2006, the entire disclosures of which are herein expressly incorporated by reference.

BACKGROUND AND SUMMARY OF THE INVENTION

This application is a national stage of International Application No. PCT/EP2006/008904, filed Sep. 13, 2006, the entire disclosure of which is herein expressly incorporated by reference.

The present invention relates to apparatus for humidifying a gas flow, including means for separating excess water from the gas flow. The invention is particularly but not exclusively applicable for humidifying fuel gas and oxidant gas used in a fuel cell for automotive applications.

A known type of fuel cell has a polymer electrolyte membrane in which hydrogen forming a fuel gas is passed over one side of the membrane (the anode). In response to an applied electrical load an electrochemical reaction takes place in which hydrogen ions migrate through the membrane to combine with oxidant (usually derived from air) on the other side (or cathode) of the membrane. It is necessary for both the hydrogen gas and the air, which are kept in separate streams, to be humidified to ensure that a necessary quantity of water passes through both sides of the fuel cell where it serves to enhance the electrochemical action and also to prevent the drying out of the membrane, which would lead to poor efficiency in the electrochemical reaction and damage the fuel cell, or at least reduce its service life.

German patent document DE 100 28 133.8 discloses apparatus which is particularly suitable for humidifying a process gas flow in a fuel cell system. The humidified device comprises three sections, a spray chamber, a heat exchanger region, and a water separator. Water is atomized and injected into the spray chamber, where it is mixed with the flow of the gas. In the heat exchange region, heat exchange means are provided which utilize the heat in the gas to at least partially evaporate water to humidify the gas and to enable the excess water to be at least partially condensed. To ensure that satisfactory humidification takes place, a greater amount of water is atomized than is theoretically required to achieve a relative humidity of the gas of 100 percent. The excess water is collected in a water collector or separator located below the heat exchanger region.

The humidified device and water separator described have disadvantages when used in an automotive application, in particular, in coping with the g-forces which occur during cornering and changes in angular position of the vehicle when the vehicle is on a sloping surface. This can lead to inefficient drainage and reduced water separation. Thus, excess water can lie on the bottom of the separator where it can be re-entrained by the gas flow and, in extreme conditions, an excess of water can enter the fuel cell, reducing its efficiency.

One object of the present invention is to provide a humidifying apparatus incorporating a water separator, which is much less sensitive to g-forces than the known device.

This and other objects and advantages are achieved by the humidification apparatus according to the present invention in which an atomized liquid is combined with a gas flow in a spray chamber to humidify the gas. The combined atomized liquid and gas are passed through a gas flow passage which comprises a generally U-shaped passage having a first generally vertical part through which the atomized liquid and gas stream pass to a lower part. From there, the gas stream passes generally vertically upwardly to an outlet. According to a feature of the invention, the lower part of the passage incorporates an opening through which excess water separated out from the gas stream can pass to a water separator. The opening is closable by a float device, or includes a water flow control valve which permits water to flow into the chamber but substantially impedes water flow from the chamber back into the gas flow passage.

Preferably, the float device controls a drain valve which controls the flow of liquid out of the water separator. In a preferred embodiment, the opening is at the lowermost part of the gas flow passage, and is relatively small compared to the cross-section of the passage and that of the water separator chamber (reservoir). In this way, water readily drains through into the water separator and reduces the amount of water that is exposed to the gas flow and is subject to possible re-entrainment. The water in the water separator is preferably transferred for use elsewhere in the fuel cell operating system for, for example, humidifying the incoming gas.

In another embodiment, the water separator chamber is substantially square or rectangular in plan view having a planar top wall which, in the installed condition on a vehicle is substantially horizontal. Four openings are located adjacent the four corners of the top wall, which forms the lower wall of the lowermost part of the gas flow passage. Preferably, each of the four openings includes a flow control valve incorporating a baffle to restrict the flow of water in a direction from the chamber to the gas passage.

Other objects, advantages and novel features of the present invention will become apparent from the following detailed description of the invention when considered in conjunction with the accompanying drawings.

DETAILED DESCRIPTION OF THE DRAWINGS

Figure 1:
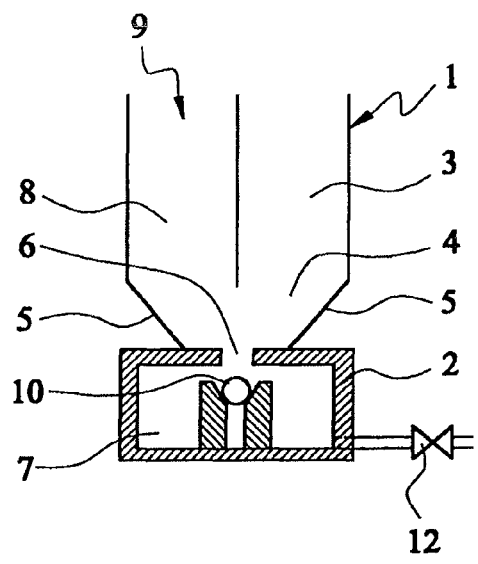
FIG. 1 is a schematic cross-sectional view of a gas flow passage in a humidifier, together with a water separator.

FIG. 1 shows a gas flow passage 1 of a fuel gas humidifier, together with a water separator 2. The further details of such a fuel gas humidifier are familiar to those skilled in the art. For example, in German Patent application DE 100 28 133.8, mentioned previously, fuel gas for a fuel cell, typically hydrogen, is mixed with atomized water in a spray chamber. The combined fuel gas and atomized water (which consists of a large number of water droplets) passes through a heat exchanger, where the water droplets are partially evaporated to humidify the gas and partially condensed into water and larger water droplets.

In the present embodiment, the combined gas and atomized water and the water droplets then pass through a generally U-shaped flow passage, first passing downwardly through a first generally vertically disposed gas flow passage section 3 to reach the lowermost part 4 of the passage 1. The latter is formed in a shaped section having inclined sides 5 to reduce the cross-sectional area of the passage in the downwardly vertical sense. The lowermost part terminates in an opening 6 leading into the water separator chamber 7.

In the lowermost part 4 of the passage, the gas flow is forced through a 180 degree turn to rise up an outlet part 8 of the gas flow passage to an outlet 9 leading to the input of a fuel cell. Thus, the opening 6 into the water separator chamber 7 is relatively small compared to be cross-section of the gas flow passage so that the possibility of water droplets being re-entrained by the gas flow is substantially reduced. The opening 6 is generally on the centerline of the water separator chamber 7 and is also much smaller than the cross-sectional area of the water separator chamber, to reduce the possibility of water in the separator chamber re-entering the gas flow passage when the vehicle's motion generates g-forces that disturb the water in the chamber. The chamber may incorporate baffles to reduce the tendency of the liquid in the chamber to surge excessively.

Additionally, the efficiency of separating out the water droplets from the humidified gas stream is increased because the effect of gravitational forces, which tend to draw the water droplets downwardly, is increased by the reversal of the gas flow. That is, the greater mass of the water droplets compared to the gas increases the rate at which they drop out of the gas, in the manner of a centrifugal separator.

The opening 6 from the gas flow passage into the water separator 7 is controlled by a float 10 in the shape of a ball which is adapted to close off the opening 6 if the water in the water separator rises above a predetermined level. Should this occur, the float 10 also may serve to operate a valve (not shown) which opens to allow water to drain out of the separator. In normal operation, the condensed water is drawn out of the water separator by a pump and recirculated to humidify the incoming fuel gas or oxidant supplied to be fuel cell.

The present design, having the U-shaped gas flow passage with the narrow opening to the water separator placed immediately beneath, enables the overall size and height of the humidifier/water separator assembly to be reduced substantially compared with the known devices referred to earlier. The design also facilitates the draining of all water out of the system so that it is far less likely to be damaged by ice formation when the vehicle is not in use under freezing conditions. The use of floats to close the opening into the water separator chamber has further advantages when water from both sides of the fuel cell (that is, the fuel gas side and the airflow side) can be vented into a common water separator chamber. The use of the floats to close the openings to the gas flow passages serves to prevent the two different gases from entering the wrong passage from the water separator chamber.

Figure 2:
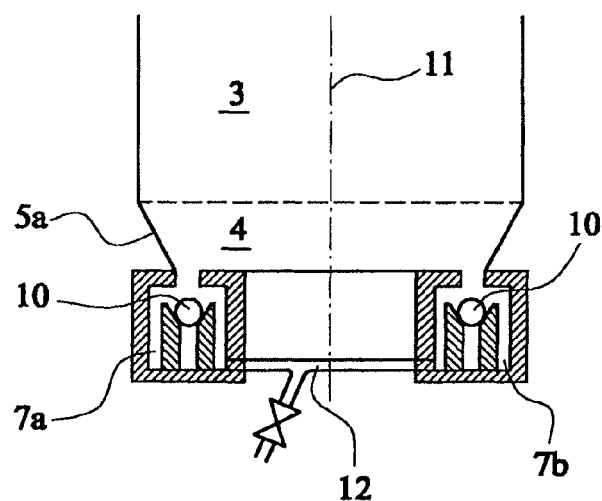
FIG. 2 is a side view of FIG. 1.

FIG. 2 shows an arrangement in which two water separator chambers 7a and 7b are provided spaced across the lowermost part of the gas flow passage 4. In an alternative form, as indicated by the dotted line 11, two flow passages may be provided side-by-side in a common housing: one for humidifying the fuel gas, and the other for humidifying the air supply providing the oxidant for the fuel cell. In this case, excess water in the process gases on both sides of the membrane are vented into a common water separator chamber.

Figure 3A:
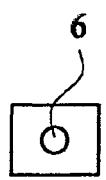
FIGS. 3a 3b, and 3c show schematically in plan view, three alternative layouts of single, double, and multi-outlet designs of water separator.
Figure 3B:
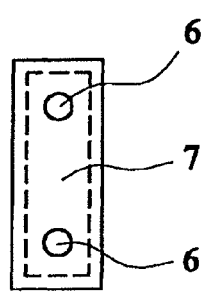
Figure 3C:
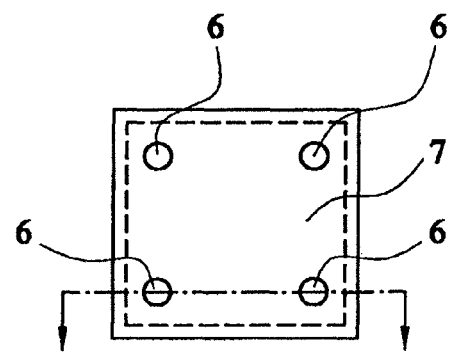

FIG. 3a shows the opening of a single chamber water separator, while FIG. 3b shows two openings which lead into a common water separator chamber 7 (although they may lead into separate chambers), and FIG. 3c shows an arrangement having four openings all opening into a common water separator chamber 7.

Figure 5:
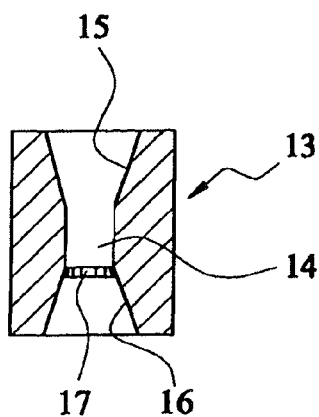
FIG. 5 is a detail view of a water flow control valve used in the embodiment of FIGS. 3c and 4.
Figure 4:
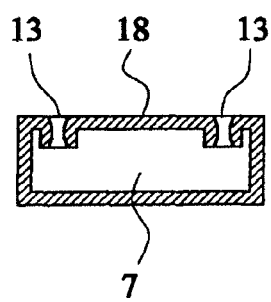
FIG. 4 is a sectional side view of the embodiment of FIG. 3c.

FIG. 4, is a sectional side view of the embodiment shown in FIG. 3c, in which four openings 6 open into a common water separator chamber 7. The four openings are spaced apart towards the four corners of the chamber 7 which is substantially square or rectangular in plan. Instead of the closable float valve 10 described in the embodiment of FIGS. 1 and 2, the openings in this embodiment each incorporate a water flow control valve 13, further details of which are shown in FIG. 5. The control valves 13 have a venturi-shaped bore with a center section 14 of reduced diameter, and tapered inlet and outlet sections 15 and 16. The lower end of the center section adjacent to the chamber 7 has a flow-restricting baffle 17 with one or more bores of a relatively small diameter. In this way, water impinging on the top wall 18 of the chamber 7, which forms the lower wall of the gas flow passage 3, can flow down through the control valves, but the baffle 17 serves effectively to prevent water rising up back into the gas flow passage.

When the apparatus is installed in a vehicle, the wall 18 is located substantially in a horizontal position. The use of four spaced apart flow control valves ensures that whether the vehicle is tilted laterally from one side to the other or fore and aft, or is subjected to g-forces laterally or fore and aft, any water separating out from the gas stream will flow on to an area of the wall 18 containing an open control valve so that the water can drain down into the chamber 7. With this arrangement, it has been found that although a degree of gas can pass into the chamber 7, this does not affect the efficient functioning of the separator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell vehicle having a longitudinal axis, a lateral axis, and a vertical axis, the fuel cell vehicle comprising:
   a fuel cell operating system;
   a device for humidifying a gas flow used in the fuel cell system, by combining it with an atomized liquid in a spray chamber, and passing it through a gas flow passage of the device for humidifying the gas flow; and
   a substantially square or rectangular water separator chamber with a top planar wall coupling the passage to the water separator chamber,
   wherein the gas flow passage is generally U-shaped, and has a first generally vertical part being parallel to the vertical axis through which the atomised liquid and gas stream passes to a lower part, from which the gas stream passes parallel to the vertical axis upwardly to an outlet,
   wherein the lower part of the passage has an opening for passing excess water separated from the gas stream, to the water separator chamber,
   wherein the top planar wall includes an opening arranged adjacent to each of the four corners of the top wall, and
   wherein each of the openings has a water flow control valve configured to permit water to flow into the chamber but substantially impede water flow from the chamber back into the gas flow passage.

2. The fuel cell vehicle according to claim 1, further comprising a valve for controlling the flow of liquid draining out of the water separator.

3. The fuel cell vehicle according to claim 1, wherein:
each of the openings is situated at the lowermost part of the gas flow passage; and
each of the openings is relatively small compared to the cross-section of the passage and the cross-section of the water separator chamber.

4. The fuel cell vehicle according to claim 1, wherein the water flow control valve of each of the openings includes a baffle to restrict a flow of water from the chamber to the gas passage.

5. The fuel cell vehicle according to claim 1, wherein the water flow control valves for each of the openings has a venturi-shaped bore with a center section of a reduced diameter and tapered inlet and outlet sections.

* * * * *